United States Patent
Artyomov et al.

(10) Patent No.: US 9,002,136 B2
(45) Date of Patent: Apr. 7, 2015

(54) DENOISING APPARATUS, SYSTEM AND METHOD

(71) Applicant: Samsung Electronics Co., Ltd., Suwon-Si, Gyeonggi-Do (KR)

(72) Inventors: Evgeny Artyomov, Ramat-Gan (IL); German Voronov, Ramat-Gan (IL); Jong-Hwa Lee, Gwangmyeong-Si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 148 days.

(21) Appl. No.: 13/889,881

(22) Filed: May 8, 2013

(65) Prior Publication Data

US 2014/0003735 A1 Jan. 2, 2014

(30) Foreign Application Priority Data

Jun. 29, 2012 (KR) ........................ 10-2012-0071067

(51) Int. Cl.
*G06K 9/40* (2006.01)
*G06T 5/00* (2006.01)

(52) U.S. Cl.
CPC ....... *G06T 5/002* (2013.01); *G06T 2207/20012* (2013.01); *G06T 2207/20021* (2013.01)

(58) Field of Classification Search
CPC ....... G06K 9/00; G06K 9/00288; G06K 9/62; G06T 2207/20012; G06T 5/002; G06T 2207/20021

See application file for complete search history.

(56) References Cited

U.S. PATENT DOCUMENTS

| 7,876,957 | B2 | 1/2011 | Ovsiannikov et al. |
|---|---|---|---|
| 2007/0133893 | A1 | 6/2007 | Jerdev |
| 2008/0285883 | A1 | 11/2008 | Lee |
| 2009/0052798 | A1 | 2/2009 | Kwon et al. |
| 2009/0087121 | A1 | 4/2009 | Han et al. |
| 2010/0220222 | A1* | 9/2010 | Naito ........................... 348/241 |

(Continued)

FOREIGN PATENT DOCUMENTS

| JP | 4440297 | 1/2010 |
|---|---|---|
| KR | 10-2005-0047714 | 5/2005 |
| KR | 10-2010-0052185 | 5/2010 |

OTHER PUBLICATIONS

English Abstract for Publication No. 10-2005-0047714.

(Continued)

*Primary Examiner* — Ali Bayat
(74) *Attorney, Agent, or Firm* — F. Chau & Associates, LLC

(57) ABSTRACT

A denoising apparatus comprising an image input unit which receives pixel data including color information of pixels included in a correction target image, a denoising unit which denoises the pixel data by a weight based averaging method, wherein the weight is set to a maximum value when a difference value between a correction target block and a comparison target block in the correction target image is zero, decreases linearly to zero as the difference value increases until it reaches a threshold value, and is set to zero when the difference value is greater than or equal to the threshold value, and an image output unit which outputs the pixel data processed by the denoising unit. The denoising unit assigns a corrected weight value to at least a guaranteed number of comparison target blocks for an impulse block, where an impulse block is a correction target block for which the number of non-zero weight valued comparison target blocks is less than a predetermined guaranteed number.

20 Claims, 11 Drawing Sheets

(56) References Cited

U.S. PATENT DOCUMENTS

| | | |
|---|---|---|
| 2011/0069886 A1 | 3/2011 | Chien et al. |
| 2011/0069904 A1 | 3/2011 | Yang et al. |
| 2011/0081096 A1 | 4/2011 | Kim |
| 2011/0142368 A1 | 6/2011 | Shin et al. |
| 2014/0079297 A1* | 3/2014 | Tadayon et al. ............... 382/118 |
| 2014/0201126 A1* | 7/2014 | Zadeh et al. ................... 706/52 |

OTHER PUBLICATIONS

English Abstract for Publication No. 2008-271492 (for JP 4440297).
English Abstract for Publication No. 10-2010-0052185.

* cited by examiner

DENOISING APPARATUS, SYSTEM AND METHOD

CROSS-REFERENCE TO RELATED APPLICATION

This application claims priority from Korean Patent Application No. 10-2012-0071067 filed on Jun. 29, 2012 in the Korean Intellectual Property Office, and all the benefits accruing therefrom under 35 U.S.C. 119, the contents of which are herein incorporated by reference in their entirety.

BACKGROUND

1. Technical Field

The present inventive concept is directed to a denoising apparatus and method, and more particularly to an apparatus and method for reducing noise in an image.

2. Description of the Related Art

A denoising technology reduces noise added to an image. One denoising technology is the averaging method, which reduces noise by averaging over pixel data. In the averaging method, when a certain pixel in the image is contaminated, the pixel is restored primarily by using only pixel data in the vicinity of the contaminated pixel. However, if the neighboring pixels are also contaminated by noise the averaging method cannot remove the contamination simply by averaging over the neighboring pixel data.

A non-local means (hereafter, "NL Means") has recently been proposed and used to reduce image noise. In this method, pixel noise is estimated on the assumption that the image repeats similar patterns, and the entire image is searched to find a neighborhood having features similar to those of the neighborhood of the denoising target pixels.

For example, to reduce the noise of a denoising target pixel block 10 in the image shown in FIG. 1, a first comparison target block 12 is more similar to the denoising target pixel block 10 than a second comparison target block 14. Accordingly, when obtaining the sum to calculate the average in the NL Means, the higher weight can be assigned to the first comparison target block 12 than to the second comparison target block 14.

The NL Means uses a weight-based average in which the sum for the average is obtained by assigning a weight based on the similarity between the neighboring regions, wherein the neighboring regions are not restricted to being adjacent to the noise-reducing target pixel block. Accordingly, the noise can be reduced even if the neighboring pixels are contaminated by noise. Another denoising method using a weight-based average is the block matching 3D (BM3D) algorithm.

In denoising algorithms using weight-based averaging, the weight is determined based on the similarity between pixel blocks. The similarity may be a difference between the pixels values included in the pixel blocks. For example, the similarity may be a sum of absolute differences (SAD) which is the sum of the differences between the pixel values included in the pixel blocks. The more similar are the pixel blocks, the smaller is the SAD. Since a higher weight may be assigned to a similar pixel block, the weight may become smaller as the difference value between the pixel blocks becomes larger. The weight may decrease linearly or exponentially as the difference value between the pixel blocks becomes larger.

However, if the weight for the pixel difference value changes exponentially, floating point operations may be necessary for weight-based averaging. Since the floating point operations are relatively slow due to greater computational complexity as compared to integer operations, a greater burden may be imposed on an image signal processor (ISP) when processing floating point operations.

SUMMARY

Embodiments of the present disclosure provide a denoising apparatus, system and method for performing high speed noise reduction, including impulse noise reduction.

Embodiments of the present disclosure also provide a denoising apparatus, system and method for minimizing the number of floating point operations to calculate the weight in a weight-based average computation for impulse noise reduction.

An embodiment of the present disclosure is a denoising apparatus that comprises an image input unit which receives pixel data including color information of pixels included in a correction target image, a denoising unit which denoises the pixel data by a weight-based averaging method, wherein the weight is set to a maximum value when a difference value between a correction target block and a comparison target block in the correction target image is zero, decreases linearly to zero as the difference value increases until it reaches a threshold value, and is set to zero when the difference value is greater than or equal to the threshold value, and an image output unit which outputs the denoised pixel data. The denoising unit assigns a corrected weight value to at least a guaranteed number of comparison target blocks for an impulse block, and the impulse block is a correction target block for which the number of non-zero weight valued comparison target blocks is less than a predetermined guaranteed number.

Another embodiment of the present disclosure is a denoising method that comprises inputting pixel data of a correction target image into a denoising apparatus and using the denoising apparatus performing a weighted-average denoising process on the pixel data. The weighted-average denoising comprises setting the weight to a maximum value when a difference value between a correction target block and a comparison target block is zero, setting the weight to decrease linearly to zero as the difference value increases until it reaches a threshold value, and setting the weight to zero when the difference value is equal to or greater than the threshold value, assigning a corrected weight value to at least a guaranteed number of the comparison target blocks whose difference value is greater than the threshold value, and averaging the correction target block and the comparison target blocks to which the corrected weight value has been assigned to reduce noise included in the pixel data. A correction target block for which the number of non-zero weight valued comparison target blocks is less than a predetermined guaranteed number is an impulse block.

Another embodiment of the present disclosure is a method for denoising pixels in a digital image that includes the steps of receiving pixel data of a correction target image, wherein the correction target image includes a correction target block of pixels to be denoised and one or more comparison target blocks of pixels; setting a weight to a maximum value when a difference value between the correction target block and a comparison target block is zero; setting the weight to decrease linearly to zero as the difference value increases until it reaches a threshold value; setting the weight to zero when the difference value is equal to or greater than the threshold value; assigning a corrected weight value to at least a guaranteed number of comparison target blocks whose difference value is greater than the threshold value; and averaging the correction target block and the comparison target blocks to which the corrected weight value has been assigned to reduce noise in the correction target block pixel data. A correction target block for which the number of non-zero weight valued comparison target blocks is less than a predetermined guaranteed number is an impulse block.

The objects of the present disclosure are not limited thereto, and the other objects of the present disclosure will be described in or be apparent from the following description of exemplary embodiments.

DETAILED DESCRIPTION OF EXEMPLARY EMBODIMENTS

Embodiments of the present disclosure will now be described more fully hereinafter with reference to the accompanying drawings, in which preferred embodiments of the disclosure are shown. This disclosure may, however, be embodied in different forms and should not be construed as limited to the embodiments set forth herein. The same reference numbers indicate the same components throughout the specification.

Figure 2:
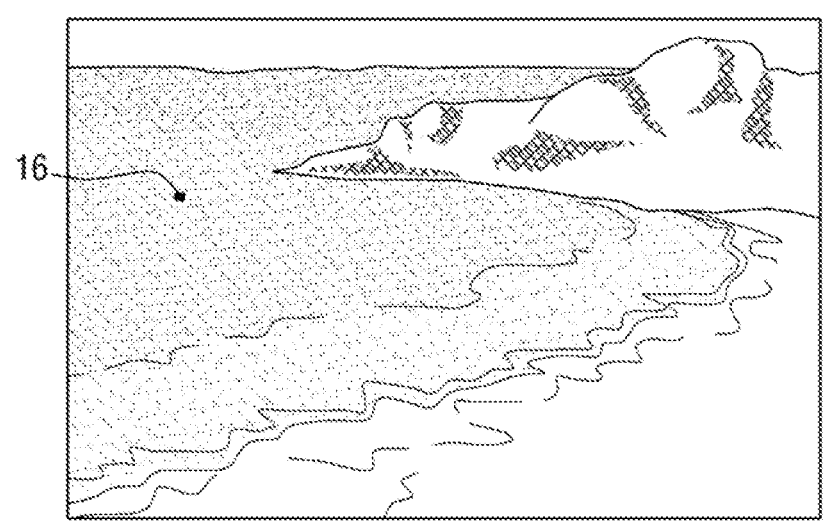
FIG. 2 illustrates a case where the noise due to an impulse block is included in a correction target image.

First, the meaning of "impulse block" as used herein is described with reference to FIG. 2.

The term "impulse noise" refers to pixels displaying an image different from the neighboring pixels due to, e.g., loss of data in the image processing technology. In an image shown in FIG. 2, a pixel block 16 including impulse noise is illustrated. The term "impulse block" as used herein refers to one or more pixel blocks in an image that include impulse noise. Since an impulse block has large differences in pixel values from neighboring pixel blocks, it is useful in noise reduction, as will be described in detail below.

In an embodiment of the present disclosure, the impulse block refers to a correction target block having a number of non-zero weight valued comparison blocks that is less than a predetermined guaranteed number.

Next, the meaning of "pixel value" as used herein will be described.

The term "pixel value" may refer to a value representing the grey scale or color of each pixel. For example, the color of each pixel may be represented by R (Red), G (Green) and B (Blue), and the pixel value may be the sum of an R channel value, a G channel value and a B channel value. However, the pixel value need not be one numerical value, and one pixel may have a set of two or more numerical values.

Next, the meaning of "difference value" as used herein will be described.

The difference value between the correction target block and the comparison target block is a value representing a difference between the pixel values included in the correction target block and the pixel values included in the comparison target block. That is, the smaller is the difference value between the correction target block and the comparison target block, the more similar is the correction target block to the comparison target block.

The difference value between the correction target block and the comparison target block can be obtained by various methods, but what these methods have in common is that the difference value is based on the difference value between the pixel values included in the correction target block and the pixel values included in the comparison target block. For example, the similarity between blocks may be calculated based on the sum of absolute differences (SAD) obtained by adding absolute values of difference values between the pixels of corresponding positions in the blocks. However, methods of calculating the difference value between the correction target block and the comparison target block in the present disclosure are not limited to calculating the difference value based on the SAD.

Figure 1:
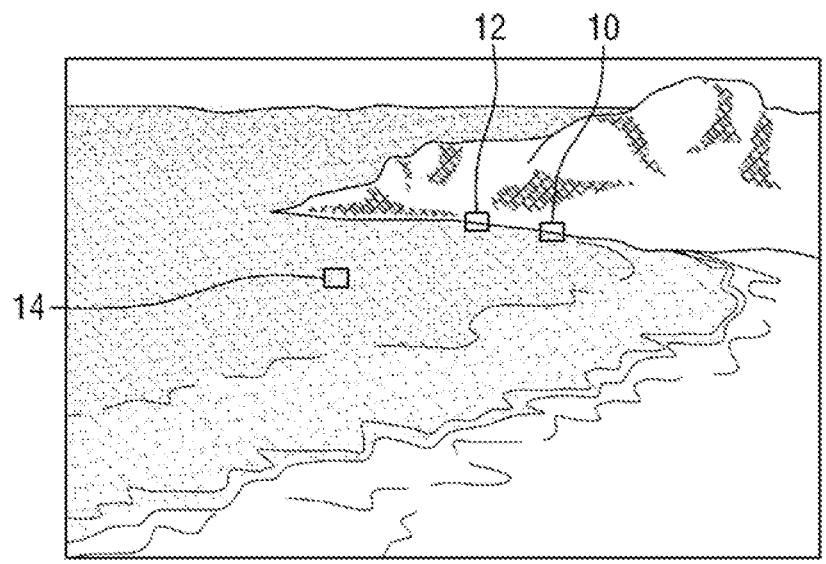
FIG. 1 illustrates the calculation of a weight and arrangement of a correction target block and a comparison target block in a conventional weight-based averaging method.

As described above with reference to FIG. 1, in a weight-based averaging method, the weight is calculated based on the difference value between the correction target block and the comparison target block. Then, the corrected pixel value of the correction target block can be obtained by assigning the weight to the comparison target blocks, adding the pixel values and dividing the sum by a reference value.

The comparison target blocks may include all blocks in the image except the correction target block, or those blocks in the neighborhood of the correction target block. As the difference value between the correction target block and the comparison target block becomes smaller, a higher weight is assigned to the comparison target block.

In addition, although in some embodiments the correction target block and the comparison target block may each include a plurality of pixels, in other embodiments of the present disclosure, the correction target block and the comparison target block may each include one pixel.

Figure 3A:
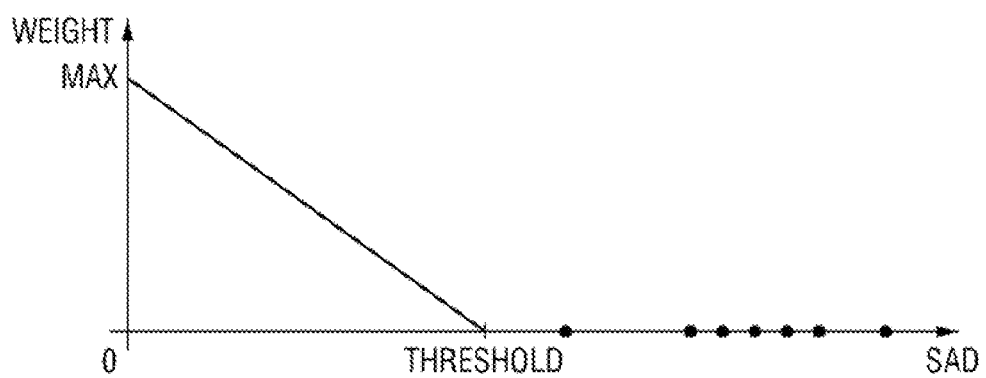
FIG. 3A is a graph showing the weight versus the SAD where the weight changes linearly with respect to the sum of absolute differences (SAD).

FIG. 3A is a graph showing the weight versus the SAD where the weight changes linearly as a function of the SAD between the correction target block and the comparison target block.

FIG. 3A illustrates a case where the SAD is used as the difference value. As the SAD difference value becomes larger, the similarity becomes smaller, and the lower weight is assigned. As shown in FIG. 3A, the weight may be set to a maximum value MAX when the difference value between the correction target block and the comparison target block is zero, may decrease linearly as the difference value increases until it reaches a threshold value, and may be set to zero when the difference value is equal to or greater than the threshold value.

In the case where the weight is assigned as shown in FIG. 3A, if the correction target image is an impulse block, it may be challenging to perform correction through averaging. FIG. 3A illustrates a case where all SADs for the comparison target blocks exceed the threshold value when the correction target block is an impulse block. In this case, a weight of zero is assigned to all comparison target blocks for the impulse block. Accordingly, it is impossible to correct the impulse block through averaging. This effect occurs because the weight decreases linearly in the graph. This effect may be mitigated if the weight decreases exponentially as shown in FIG. 3B.

Figure 3B:
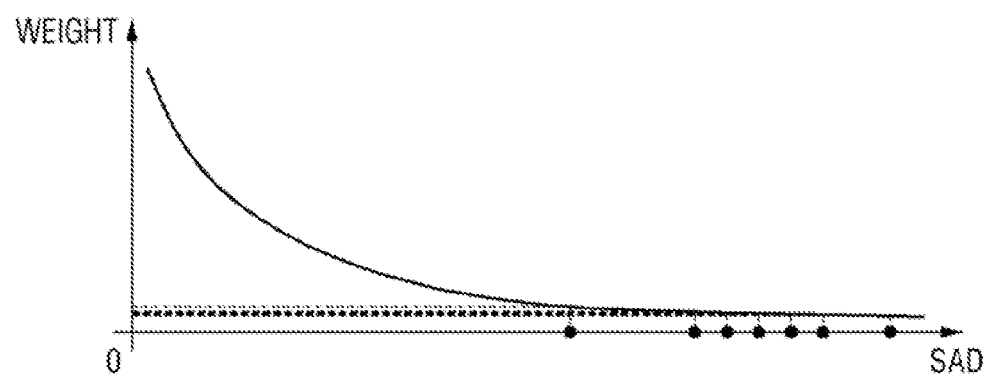
FIG. 3B is a graph showing the weight versus the SAD where the weight changes exponentially with respect to the sum of absolute differences (SAD).

If the weight decreases exponentially according to the graph shown in FIG. 3B, even though the SAD of a specific comparison target block can exceed the threshold value, the weight does not become zero. Accordingly, a correction target block that is an impulse block can also be corrected through averaging with other comparison target blocks.

However, floating point operations are necessary where the weights for the pixel difference value change exponentially as shown in FIG. 3B. Since floating point operations are relatively slow due to greater computational complexity as compared to integer operations, a greater computational burden may be imposed on an image signal processor (ISP) when processing a floating point operation. However, a denoising apparatus of the present disclosure uses a denoising method that supports averaging for an impulse block even if the weight changes linearly with respect to the difference value.

Figure 4:
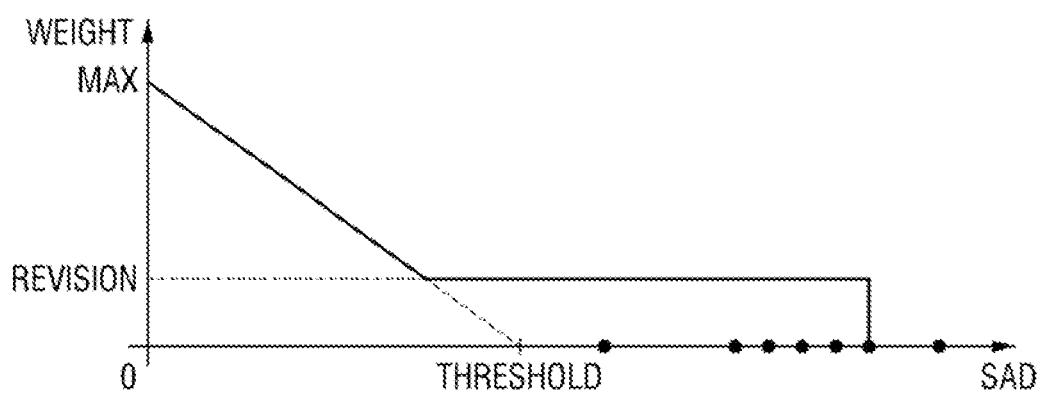
FIGS. 4 to 6 are graphs showing a linear weight that can be used in a denoising apparatus to correct the impulse block noise in accordance with an embodiment of the present disclosure.
Figure 5:
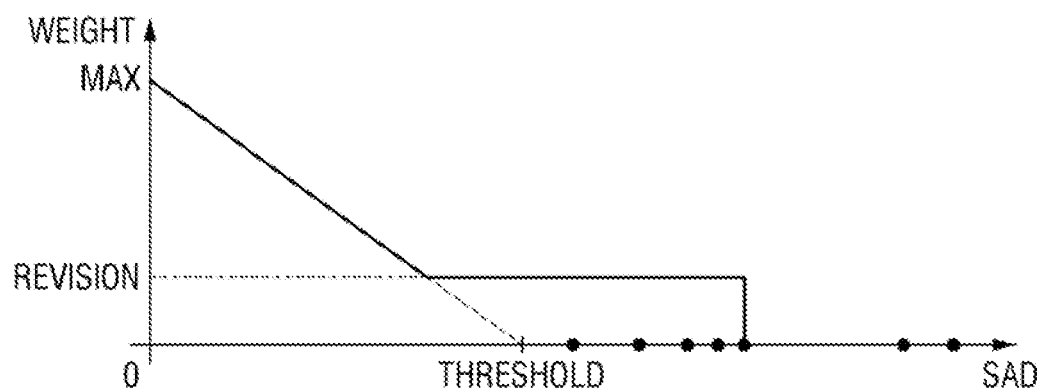
Figure 6:
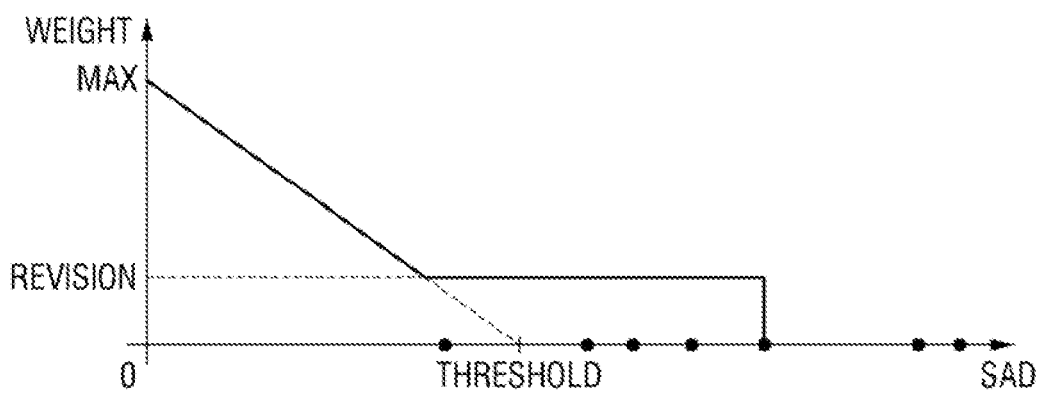

The operation of a denoising apparatus in accordance with an embodiment of the present disclosure will be described with reference to the graphs of FIGS. 4 to 6, which show a linear weight that can be used in the denoising apparatus to correct the impulse block. FIGS. 4 to 6 assume that the correction target block corresponds to a correction target region, the comparison target blocks correspond to regions except the correction target region and have the same area as the correction target block, and the SAD between blocks is used as the difference value.

First, FIG. 4 is a graph showing the weight as a function of the difference value between the correction target block and the comparison target block, which can be used for noise reduction in accordance with the embodiment of the present disclosure.

The graph of FIG. 4 is similar to that of FIG. 3A in that the weight is set to a maximum value when the SAD between the correction target block and the comparison target block is zero, and decreases linearly as the SAD increases. However, the graph of FIG. 4 differs from that of FIG. 3A in that a non-zero weight value is assigned to five SADs whose value exceeds the threshold value, where the number five corresponds to the guaranteed number.

That is, a denoising apparatus in accordance with an embodiment of the present disclosure can provide a correction function for the impulse block that increases the weight to a corrected weight value for up to at least the guaranteed number of comparison target blocks.

In a denoising apparatus in accordance with an embodiment of the present disclosure, the weight increase for those comparison target blocks whose weights are being corrected is not based on the difference value.

In general, the number of the comparison target blocks is larger than the guaranteed number. In a denoising apparatus in accordance with an embodiment of the present disclosure, the weight may be increased for a number of comparison target blocks having a difference value greater than the threshold value, where the number is less than or equal to the guaranteed number of comparison target blocks.

To this end, in a denoising apparatus in accordance with an embodiment of the present disclosure, the comparison target blocks for the impulse block are sorted on the basis of their difference values. Among the sorted comparison target blocks, up to the guaranteed number of comparison target blocks having smaller difference values are selected, and the corrected weight value can be assigned only to the selected comparison target blocks.

Similarly, FIG. 5 illustrates a case where the weight is increased for five SADs. Comparing FIG. 4 with FIG. 5, in a denoising apparatus in accordance with an embodiment of the present disclosure, it can be seen that the weight increase is not based on the difference value.

In a denoising apparatus in accordance with an embodiment of the present disclosure, as shown in FIG. 6, even when there are one or more comparison target blocks for which the weight is not zero, if the number of the comparison target blocks is less than the guaranteed number, the correction target block can be considered to be an impulse block.

Since noise patterns may be similar, a first impulse block and a neighboring second impulse block may have similar pixel values. In this case, if the first impulse block is the correction target block and the second impulse block is a comparison target block, a non-zero weight is assigned to the second impulse block.

If a denoising apparatus in accordance with an embodiment of the present disclosure is operated as shown in FIG. 6, even though there is another impulse block in the neighborhood of the correction target impulse block, and there are one or more comparison target blocks having a non-zero weight, unless the number of impulse blocks in the neighborhood of the correction target impulse block is greater than or equal to the guaranteed number, one may reduce the noise in the correction target impulse block by averaging over the normal comparison target blocks. That is, in a denoising apparatus according to an embodiment, even if there is another impulse block among the comparison target blocks having a non-zero weight, a corrected weight value may be assigned to some general blocks for which the weight is otherwise zero, and the averaging may be performed on the impulse block and the general blocks.

FIGS. 5 and 6 illustrate a case in which the guaranteed number is five. In FIG. 6, there is one comparison target block for which the difference value with respect to the correction target block is less than the threshold value, so a denoising apparatus according to an embodiment increases the weight of the remaining four comparison target blocks to the corrected weight value.

The above-described threshold value, guaranteed number and corrected weight value are values that can be modified. A denoising apparatus according to an embodiment may receive as input at least one of the threshold value, the guaranteed number and the corrected weight value, and store the input data.

Figure 7:
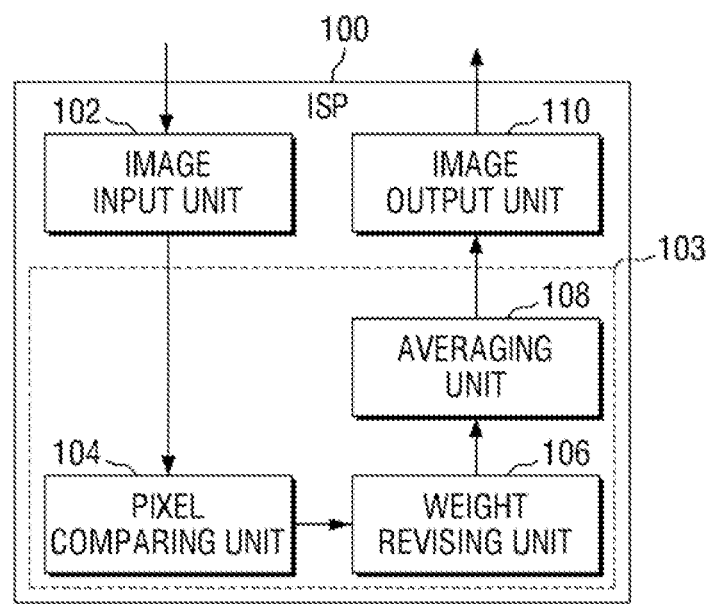
FIG. 7 is a block diagram showing a configuration of a denoising apparatus in accordance with an embodiment of the present disclosure.

The structure of the above-described denoising apparatus will be described with reference to FIG. 7. As shown in FIG. 7, a denoising apparatus 100 in accordance with an embodiment of the present disclosure may include an image input unit 102, a denoising unit 103 and an image output unit 110. The denoising apparatus 100 in accordance with an embodiment of the present disclosure may be configured in the form of, e.g., an image signal processor (ISP). However, it should be noted that the denoising apparatus 100 in accordance with an embodiment of the present disclosure may include all types of apparatuses in which the image input unit 102 receives the pixel data input from the correction target image, the denoising unit 103 performs noise reduction on the pixel data of the correction target image, and the image output unit 110 outputs the noise-reduced pixel data of the correction target image after the noise reduction process, and the configuration of the denoising apparatus 100 is not limited to a specific chip.

Although not shown in FIG. 7, the denoising apparatus 100 may further include a setting input unit which receives input data for at least one of the threshold value, the guaranteed number and the corrected weight value, and non-volatile memory module which stores the input data for at least one of the threshold value, the guaranteed number and the corrected weight value.

The image input unit 102 receives the pixel data including color information for the pixels included in the correction target image. For example, if the correction target image includes 100 pixels in a horizontal direction and 100 pixels in a vertical direction, the pixel data may include data for 10000 pixels. The data for each pixel may include color information for each pixel.

The denoising unit 103 receives the pixel data from the image input unit 102, generates the corrected pixel data by reducing noise in the original pixel signals, and provides the corrected pixel data to the image output unit 110.

The denoising unit 103 denoises the pixels included in the pixel data by a weight-based averaging method. In this case, the weight is set to a maximum value when the difference value between the correction target block and the comparison target block is zero, and decreases linearly as the difference value increases until it reaches the threshold value, and is set to zero when the difference value is greater than or equal to the threshold value, except for up to a guaranteed number of comparison target blocks.

The denoising unit 103 reduces noise in the pixel data by assigning a corrected weight value to a number of comparison target blocks for the impulse block that is less than or equal to the guaranteed number, and averaging the correction target block and the weighted comparison target blocks.

The denoising unit 103 may include, as internal modules, a pixel comparing unit 104, a weight correcting unit 106 and an averaging unit 108.

The pixel comparing unit 104 receives the pixel data from the image input unit 102. Further, the pixel comparing unit 104 compares pixel data of each correction target block with the comparison target blocks. That is, the pixel comparing unit 104 calculates the difference value between each correction target block and the comparison target blocks. Then, the pixel comparing unit 104 assigns a weight to each comparison target block using the difference value of each comparison target block.

The weight and the difference value of each comparison target block are transmitted to the weight correcting unit 106. The weight correcting unit 106 determines whether the correction target block is an impulse block. The determination is made based on whether the number of non-zero-weighted comparison target blocks is less than the predetermined guaranteed number. For example, in a case where the guaranteed number is ten, if the number of non-zero-weighted comparison target blocks is three, then the correction target block corresponds to an impulse block.

If a specific correction target block corresponds to an impulse block, the weight correcting unit 106 selects that specific correction target block to be an impulse block, and increases the weight assigned to the correction target block to the corrected weight value. The specific correction target blocks that are selected to be an impulse block are referred to herein below as weight correction target blocks.

Figure 8:
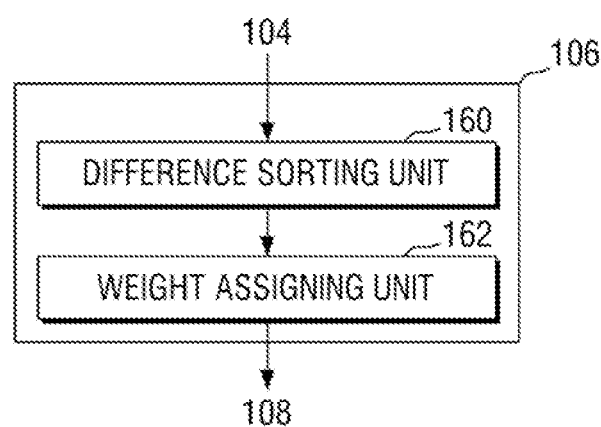
FIG. 8 is a block diagram showing a detailed configuration of a denoising apparatus in accordance with an embodiment of the present disclosure.

A detailed structure of the weight correcting unit 106 associated with selection of the weight correction target block will be described with reference to FIG. 8. As shown in FIG. 8, the weight correcting unit 106 may include a difference value sorting unit 160 for selecting the weight correction target blocks, and a weight assigning unit 162 for assigning the weight based on the sorting results of the difference value sorting unit 160. As described above, since the weight is increased for up to a predetermined number of comparison target blocks having a difference value greater than the threshold, the difference value sorting unit 160 sorts the comparison target blocks based on the difference value.

The weight correcting unit 106 provides the difference value and corrected weight information for each comparison target block.

The averaging unit 108 may sum the weighted pixel values of the comparison target blocks, and divide the sum by a reference value, which is used to set new pixel values for each of the pixels included in the correction target block.

The averaging unit 108 may add the pixel values of the correction target block to the sum of the weighted pixel values of the comparison target blocks, and divide the resultant value by the reference value, to set new pixel values to the pixels included in the correction target block.

The reference value may be the sum of the weights assigned to the comparison target blocks.

The denoising apparatus shown in FIGS. 7 and 8 could sort the comparison target blocks to determine the weight correction target block. However, sorting typically has a time complexity of O(N log N) if the data size is N. As the size of the comparison target blocks becomes larger, more computation is consumed. To reduce the amount of computation, a method for finding the guaranteed number of comparison target blocks without sorting will be described below.

A denoising apparatus of an embodiment sets a plurality of bins in advance. The bins have different ranges of the difference value. When the difference value for each comparison target block is computed, a denoising apparatus of an embodiment puts the comparison target block into the bin whose difference value range includes the computed difference value.

Figure 9:
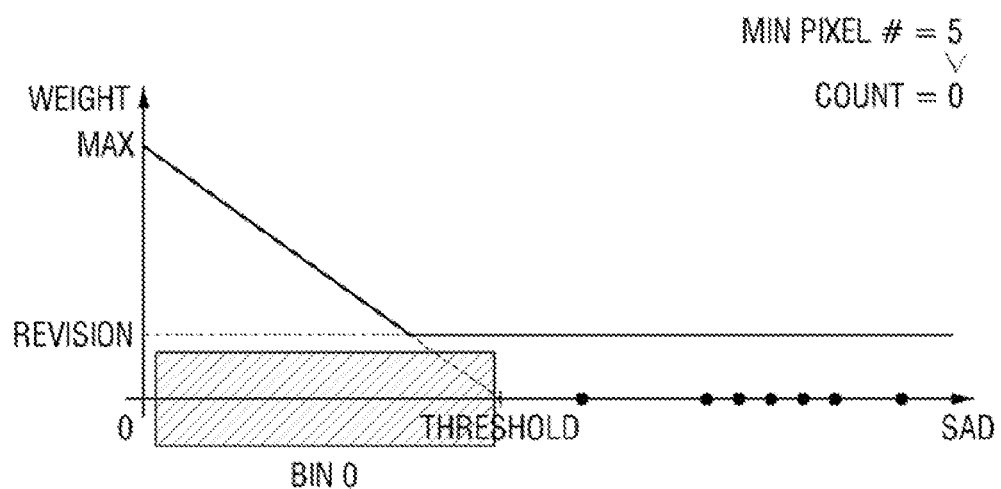
FIG. 9 is a first linear weight graph for obtaining non-sorted correction target and comparison target blocks that can be used in a denoising apparatus to correct the impulse block in accordance with an embodiment of the present disclosure.
Figure 10:
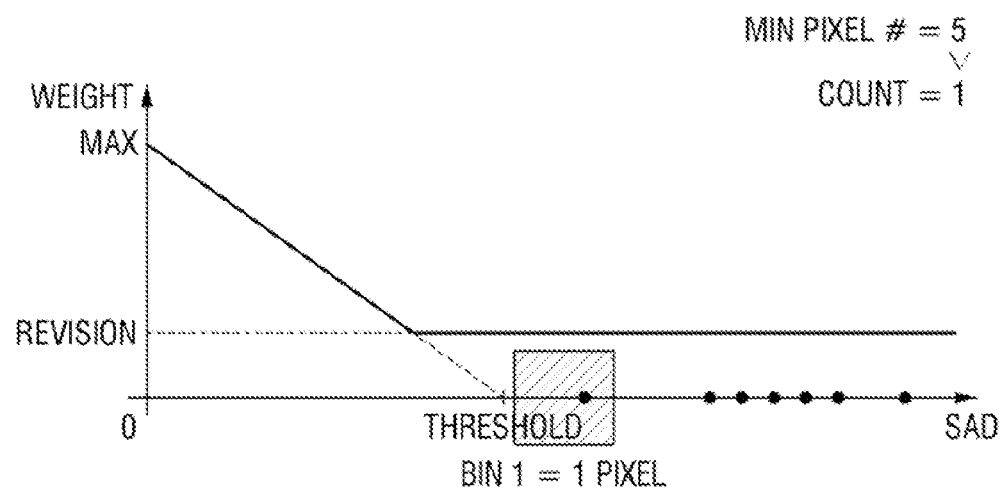
FIG. 10 is a second linear weight graph for obtaining non-sorted correction target and comparison target blocks that can be used in a denoising apparatus to correct the impulse block in accordance with an embodiment of the present disclosure.
Figure 11:
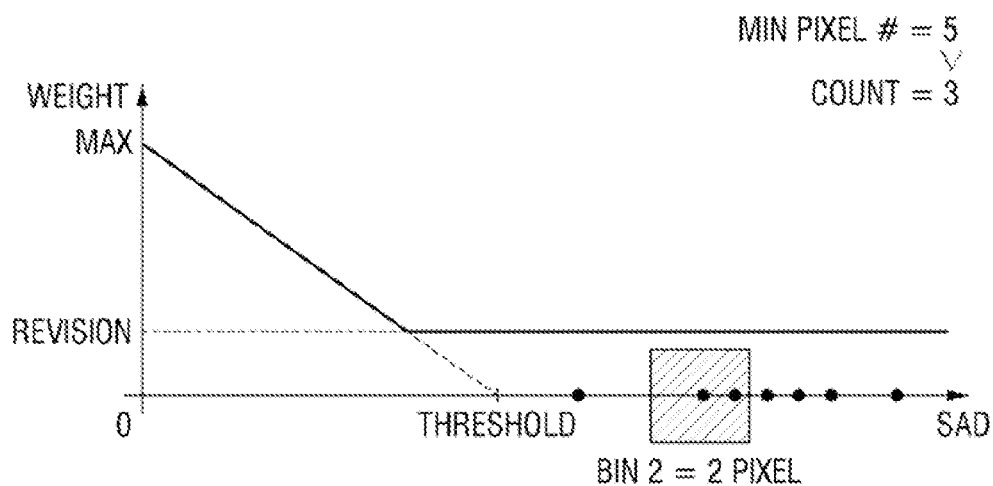
FIG. 11 is a third linear weight graph for obtaining non-sorted correction target and comparison target blocks that can be used in a denoising apparatus to correct the impulse block in accordance with an embodiment of the present disclosure.
Figure 12:
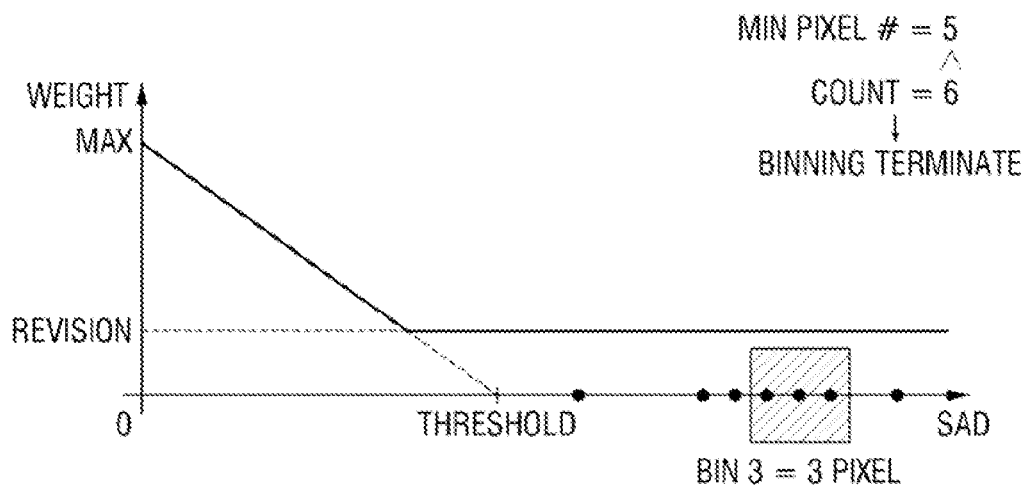
FIG. 12 is a fourth linear weight graph for obtaining non-sorted correction target and comparison target blocks that can be used in a denoising apparatus to correct the impulse block in accordance with an embodiment of the present disclosure.

As shown in FIG. 9, one bin, referred to herein below as an internal bin, may have a difference value range from zero to the threshold value. That is, comparison target blocks having a non-zero weight may be put in the internal bin. Further, as shown in FIGS. 10 to 12, comparison target blocks having a zero weight may be put in one or more additional bins, referred to herein below as external bins. That is, a difference value range of the one or more external bins includes values greater than the threshold value, and every external bin may have a same difference value range size, which may be predetermined. According to an embodiment of this disclosure, the number of the external bins may be greater than two to classify the zero-weight comparison target blocks into at least two groups. The difference value range of the external bins can be adjusted so that each external bin includes a proper number of comparison target blocks.

The setting input unit (not shown) may further receive the difference value range size of the external bins and the number of the external bins, and the non-volatile memory module may further store the external bin size and the number of the external bins.

The operation of selecting the weight correction target block will be described with reference to FIGS. 9 to 12 assuming that a denoising apparatus of an embodiment puts each comparison target block in one of the bins. In FIGS. 9 to 12, the guaranteed number may be five.

A denoising apparatus of an embodiment puts the comparison target blocks for the impulse block into bins whose difference value ranges includes the difference value, adds the bins into the weight correction target one by one in order of increasing difference value range of each bin until the number of all comparison target blocks included in the weight correction target is greater than or equal to the guaranteed number.

According to this configuration, as shown in FIG. 9, first, the block put into internal bin BIN 0 is added as a weight correction target block. Since the correction target block is an impulse block, there are few comparison target blocks in BIN 0. If comparison target blocks are present in BIN 0, the weight may be increased to the corrected weight value only when the weight of the comparison target block is less than the corrected weight value.

In FIG. 9, there are no comparison target blocks in BIN 0 (COUNT=0).

In FIG. 10, there is one comparison target block in BIN 1 (COUNT=1).

In FIG. 11, there are two comparison target blocks in BIN 2 (COUNT=3).

In FIG. 12, there are three comparison target blocks in BIN 3 (COUNT=6).

When the weight correction target adding operation for BIN 3 has been completed, the number (COUNT) of all comparison target blocks included in the weight correction target is six, which is greater than the guaranteed number of five. Accordingly, the weight correction target adding operation is completed. As a result, a denoising apparatus of an embodiment increases the weight for all comparison target blocks included in BIN 1, BIN 2 and BIN 3 to the corrected weight value.

According to a method shown in FIGS. 9 to 12, the operation of computing the difference value of each comparison target block can be performed simultaneously with the operation of putting the comparison target blocks into the bins (O(N)), which requires only one additional cyclic operation for each bin (O(1)). Thus, a method shown in FIGS. 9 to 12 is faster than a method of selecting the weight correction target blocks by sorting.

Figure 13:
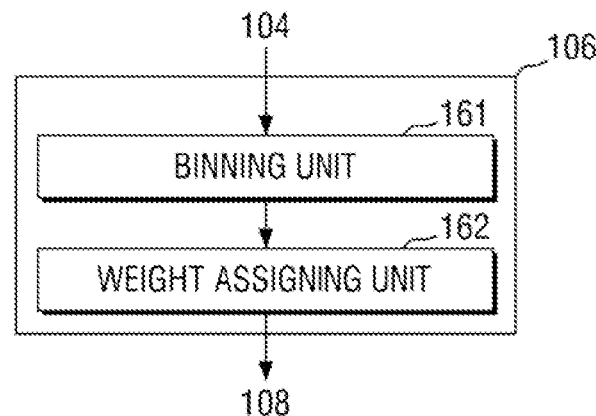
FIG. 13 is a block diagram showing a detailed configuration of a denoising apparatus in accordance with an embodiment of the present disclosure.

FIG. 13 illustrates the configuration of the weight correcting unit 106 of a denoising apparatus 100 according to a method shown in FIGS. 9 to 12, which differs from the configuration of a weight correcting unit in which the weight correction target block is selected by sorting.

The weight correcting unit 106 of the denoising apparatus 100 of an embodiment may include a binning unit 161 and the weight assigning unit 162.

The binning unit 161 puts each comparison target block for the impulse block into a bin whose difference value ranges includes the comparison target block difference value, adds the bins one by one in order of increasing difference value range of each bin until the number of comparison target blocks included in the weight correction target is equal to or greater than the guaranteed number.

The weight assigning unit 162 increases the weight of those comparison target blocks that are weight correction targets to the corrected weight value.

The denoising apparatus 100 in accordance with an embodiment of the present disclosure may classify the comparison target blocks for the impulse block based on their difference values, select up to the guaranteed number of comparison target blocks from those having smaller difference values as the weight correction targets, based on the classification results, and assign the corrected weight value to the selected comparison target blocks.

Classifying the comparison target blocks for the impulse block based on their difference values may mean grouping the comparison target blocks for the impulse block based on their difference values. That is, the comparison target blocks may be classified into two or more groups based on their difference values.

To select up to exactly the guaranteed number of comparison target blocks having smaller difference values, a sort may be performed. However, for grouping the comparison target blocks and selecting at least the guaranteed number of comparison target blocks as the weight correction targets based on the classification results, no sort needs to be performed. The denoising apparatus 100 of an embodiment may assign a corrected weight value to those zero-weight comparison target blocks among the selected comparison target blocks.

Figure 14:
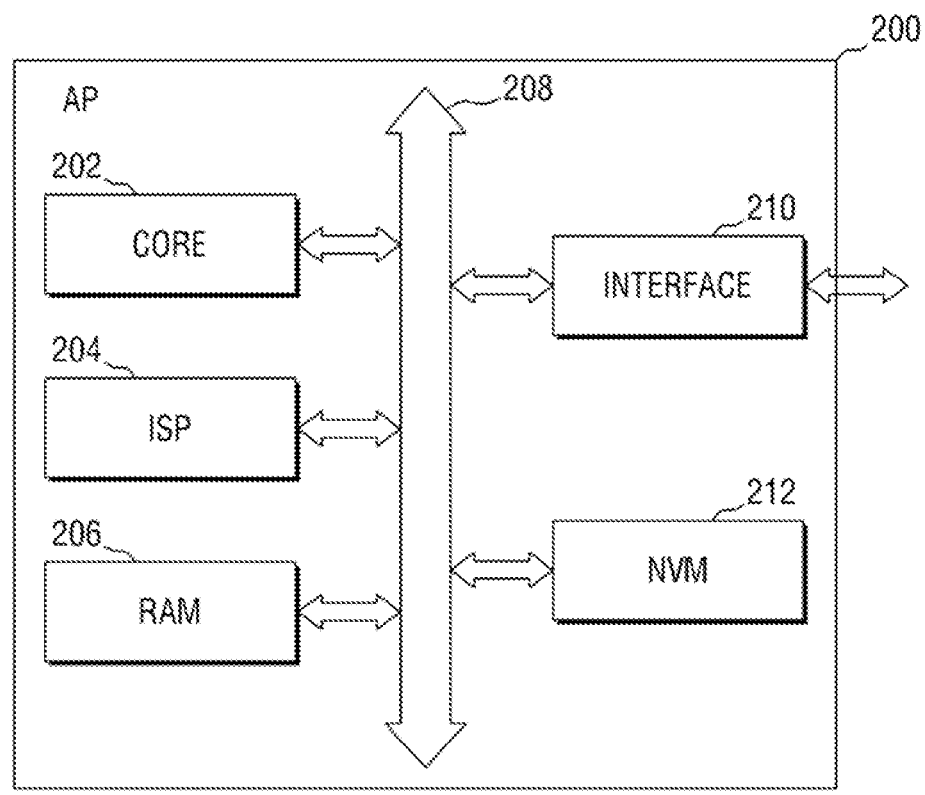
FIG. 14 is a block diagram showing a configuration of a denoising system in accordance with an embodiment of the present disclosure.

FIG. 14 is a block diagram of a configuration of a denoising system in accordance with an embodiment of the present disclosure. As shown in FIG. 14, a denoising system 200 in accordance with an embodiment of the present disclosure may include an interface 210, an ISP 204, and a core 202, and may further include a RAM 206, a non-volatile memory 212, and an internal data path 208.

The interface 210 is connected to an external device (not shown) to receive from the external device pixel data, including color information, of each pixel included in the correction target image and provide the pixel data to the ISP 204. The external device may be any device connected to a denoising system according to an embodiment, and is not limited to a device having a specific function. The external device may be, e.g., a storage device or image sensor.

The ISP 204 reduces noise in the pixels by a weight-based averaging method. The weight is set to a maximum value when the difference value between the correction target block and the comparison target block is zero, and decreases linearly as the difference value increases until it reaches the threshold value, and is set to zero when the difference value is equal to or greater than the threshold value. The ISP 204 assigns a corrected weight value to at least the guaranteed number of comparison target blocks for the impulse block, where the number of non-zero weighted comparison target blocks is less than the guaranteed number, and averages the correction target block and the weight-corrected comparison target blocks to output the corrected pixel data through the interface 210.

The core 202 executes a set of commands stored in the RAM 206. The core 202 may control the interface 210 and the ISP 204 by executing commands in the set of commands.

The core 202 may receive the input data of at least one of the threshold value, the guaranteed number and the corrected weight value from the external device by executing other commands in the set of commands. The core 202 may store the data received from the external device in the non-volatile memory 212 by executing still other commands in the set of commands. The ISP 204 may load at least one of the threshold value, the guaranteed number and the corrected weight value stored in the RAM 206 to be used in the noise reduction.

The denoising system 200 according to an embodiment may be configured as an application processor AP.

Figure 15:
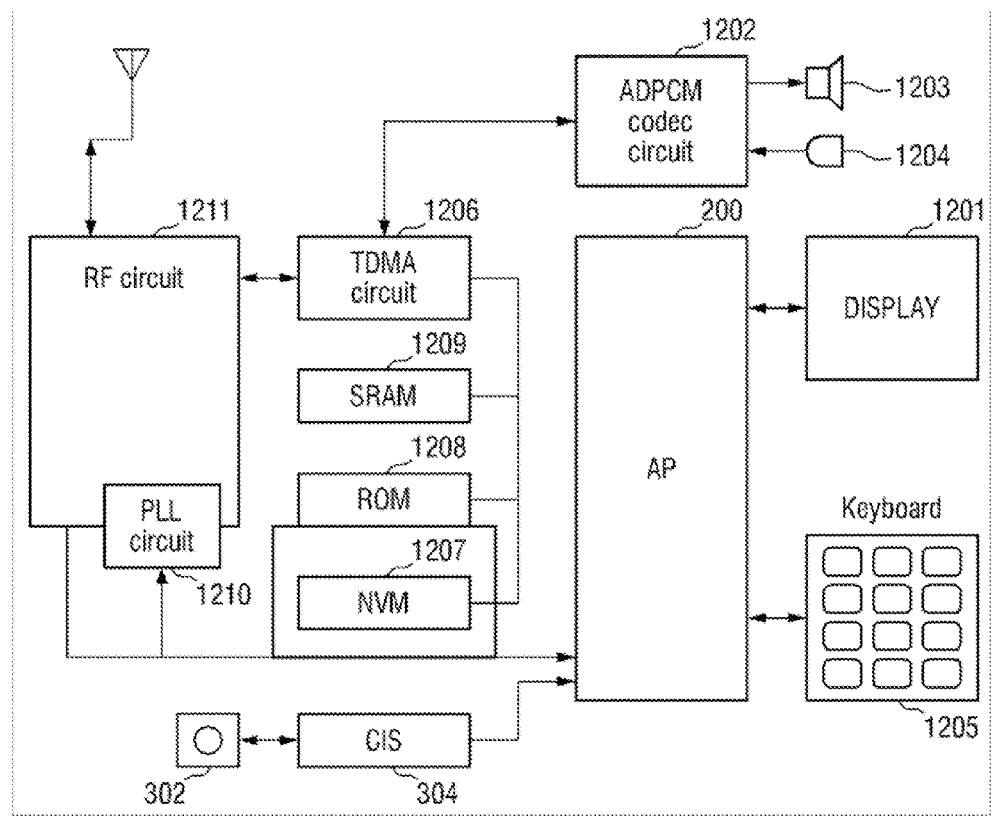
FIG. 15 shows a configuration of a mobile terminal in accordance with an embodiment of the present disclosure.

FIG. 15 shows a configuration of a mobile terminal in accordance with an embodiment of the present disclosure.

A mobile terminal 300 in accordance with an embodiment of the present disclosure may be, e.g., a wireless mobile communication terminal. As shown in FIG. 15, the mobile terminal 300 according to an embodiment may include an AP 200, a camera lens 302, an image sensor (CMOS (complementary metal oxide semiconductor) image sensor (CIS)) 304 connected to the camera lens 302, a display 1201, an ADPCM (adaptive differential pulse-code modulation) codec circuit 1202 for compressing the sound or decompressing the compressed sound, a speaker 1203, a microphone 1204, a TDMA (time division multiple access) circuit 1206 for performing time-division multiplexing on digital data, a PLL (phase lock loop) circuit 1210 for setting a carrier frequency of a wireless signal, an RF (radio-frequency) circuit 1211 for transmitting or receiving a wireless signal, and the like.

Further, the mobile terminal 300 may include various types of memory devices. For example, the mobile terminal 300 may include a non-volatile memory device 1207, a ROM (read only memory) 1208 and an SRAM (static random-access memory) 1209. The ROM 1208 may store firmware programs, and the SRAM 1209 may serve as an operating region for the AP 200, or temporarily store the data.

The AP 200 may be the denoising apparatus 200 shown in FIG. 14 in accordance with an embodiment of the present disclosure. As shown in FIG. 14, the AP 200 may be connected to the image sensor 304, and the ISP 204 of the AP 200 may receive the image through the interface 210 from the image sensor 304, perform noise reduction, and output the noise-reduced data to the display 1201 through the interface 210. That is, the AP 200 may reduce noise in the image data received from the camera lens 302 and the image sensor 304, and then display the noise-reduced image data through the display 1201

Hereinafter, a denoising method in accordance with an embodiment of the present disclosure will be described with reference to FIG. 16.

Figure 16:
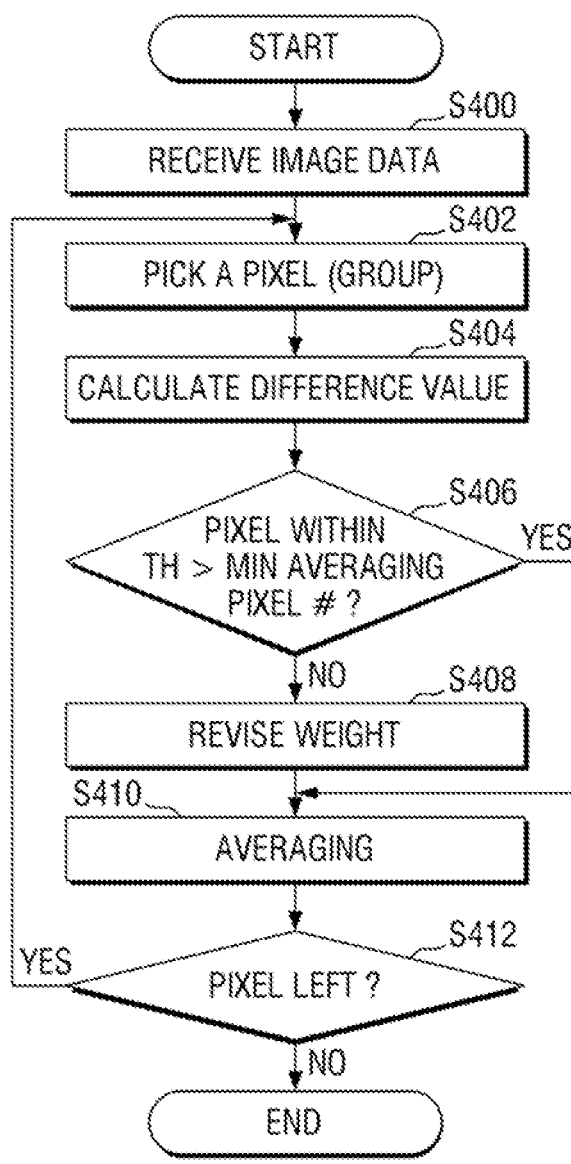
FIG. 16 is a flowchart of a denoising method in accordance with an embodiment of the present disclosure.

The method of FIG. 16 uses a denoising apparatus that includes a receiving unit which receives the pixel data of the pixels included in the correction target image, and a computing unit which performs computations on the pixel data. The pixel data may include color information. The denoising apparatus may be, e.g., an application processor (AP) or a mobile terminal including the application processor.

The pixel data of the correction target image is received by the denoising apparatus (S400).

Then, the denoising process is performed on the pixels included in the pixel data by a weight-based averaging method using the denoising apparatus.

Hereinafter, a denoising process will be described in more detail.

First, the weight is set to a maximum value when the difference value between the correction target block and the comparison target block is zero, and is set to decrease linearly as the difference value increases until it reaches the threshold value, and is set to zero when the difference value is equal to or greater than the threshold value.

One correction target block or correction target block group is selected from the pixel data of the input image (S402). The selection may involve sequentially selecting all blocks of the input image one by one.

For the selected block, the difference values with all comparison target blocks or all comparison target block groups are calculated (S404).

It is determined whether the number of comparison target blocks in which the calculated difference value is greater than or equal to the predetermined threshold value is greater than or equal to the predetermined guaranteed number (S406). That is, it is determined whether the number of non-zero weighted comparison target blocks is greater than or equal to the predetermined guaranteed number.

As a result of the determination (S406), if the number of the comparison target blocks for which the difference value is less than or equal to the predetermined threshold value is greater than or equal to the predetermined guaranteed number, then the correction target block or the correction target block group does not require the weight correction, and an averaging operation (S410) may be performed to reduce noise in the correction target block or the correction target block group.

On the other hand, as a result of the determination (S406), if the number of the comparison target blocks having a difference value less than or equal to the predetermined threshold value is less than the predetermined guaranteed number, since the correction target block has few or no weighted comparison target blocks for averaging, the weight of some of the comparison target blocks is increased so that at least the guaranteed number of comparison target blocks have a weight greater than or equal to the corrected weight value (S408). For example, the weight of at least five comparison target blocks having a difference value larger than the threshold may be increased to the predetermined corrected weight value. After weight correction for the correction target blocks for the impulse block is completed, an averaging operation (S410) may be performed to reduce noise on the impulse block.

The operations S402, S404, S406, S408 and S410 to select the correction target block and perform noise reduction for the correction target block are repeated until noise reduction for all blocks of the input image is completed (S412).

Hereinafter, a denoising method in accordance with an embodiment of the present disclosure will be described with reference to FIG. 17.

A denoising method according to an embodiment does not sort the comparison target blocks based on their difference values when selecting the weight correction target blocks for the impulse block.

Figure 17:
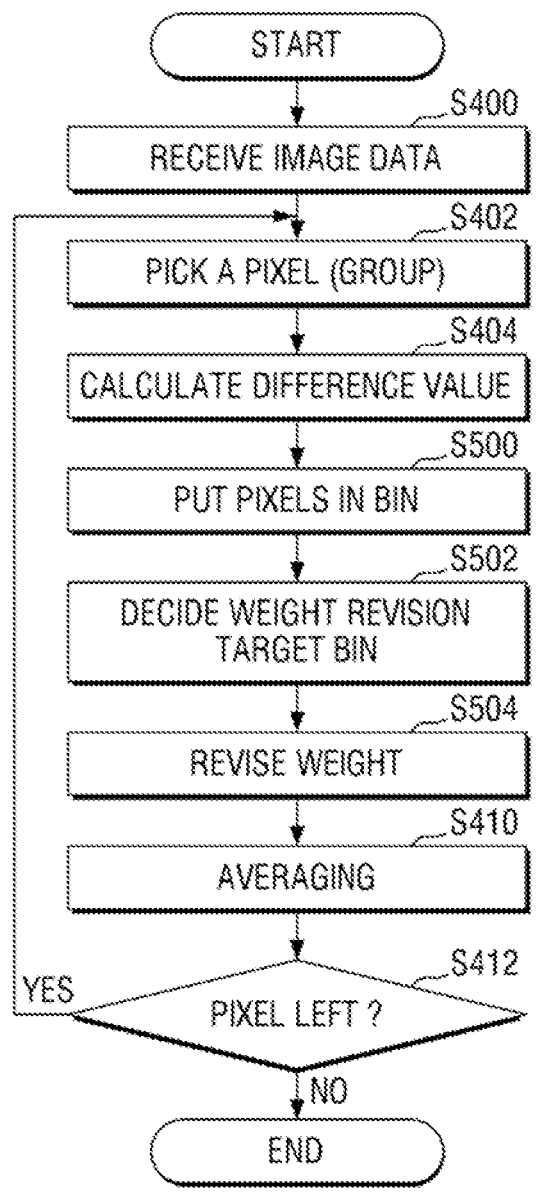
FIG. 17 is a flowchart of another denoising method in accordance with an embodiment of the present disclosure.

The method of FIG. 17 uses a denoising apparatus that includes a receiving unit which receives pixel data, including color information, of the pixels included in the correction target image, and a computing unit which performs computations on the pixel data. The denoising apparatus may be, e.g., an application processer (AP) or a mobile terminal including the application processer. Further, the denoising apparatus uses a plurality of bins having different difference value ranges. One of the bins, referred to as an internal bin, may have a difference value range from zero to the predetermined threshold value. Hereinafter, the bins whose ranges include values greater than or equal to the predetermined threshold value are referred to as external bins. For example, the predetermined threshold value may be 5, BIN 1 may have a difference value range from 5 to 10, BIN 2 may have a difference value range from 10 to 20, and BIN 3 may have a difference value range from 20 to 50. As the difference value increases, a difference value range for each bin may increase.

The pixel data of the correction target image is received by the denoising apparatus (S400).

Then, a weight-based averaging denoising process is performed on the pixels included in the pixel data using the denoising apparatus.

Hereinafter, the denoising process will be described in more detail.

First, the weight is set to a maximum value when the difference value between the correction target block and the comparison target block is zero, and is set to decrease linearly as the difference value increases until it reaches the threshold value, and is set to zero when the difference value is equal to or greater than the threshold value.

One correction target block is selected from the pixel data of the input image (S402). The selection may involve sequentially selecting all blocks of the input image one by one.

For the selected block, the difference values with all comparison target blocks are calculated (S404), and when the difference value is calculated, the comparison target block is put into the bin whose range includes the difference value (S500). For example, if BIN 2 has a difference value range from 10 to 20, a comparison target block for which the difference value is 15 is put into BIN 2.

Then, it is determined whether the correction target block is an impulse block. The determination of an impulse block may be performed by checking whether the number of the comparison target blocks put into the internal bins is greater than or equal to the guaranteed number. That is, if the number of the comparison target blocks put into the internal bins is less than the guaranteed number, it may be determined that the correction target block is an impulse block.

If the correction target block is an impulse block, the weight correction target block is determined from the comparison target blocks in the bins (S502). For example, the bins may be added one by one in the order of increasing difference value range of each bin until the number of all comparison target blocks included in the weight correction target is greater than or equal to the guaranteed number. A method of determining the weight correction target bin can be understood with reference to FIGS. 9 to 12.

The weight of the comparison target blocks included in the weight correction target block is increased to the predetermined corrected weight value (S504). After the weight correction is completed, an averaging operation (S410) is performed on the impulse block to reduce noise.

The operations S402, S404, S500, S502, S504 and S410 to select the correction target block and perform the noise reduction for the correction target block are repeated until noise reduction for all pixels of the input image is completed (S412).

According to the present disclosure, noise reduction, including impulse noise reduction, may be performed at a high speed.

Further, a weight-based averaged noise reduction may be performed on the impulse block even if the weight decreases linearly as the SAD between the correction target block and the comparison target block increases.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims. It is therefore desired that the present exemplary embodiments be considered in all respects as illustrative and not restrictive, reference being made to the appended claims rather than the foregoing description to indicate the scope of the disclosure.

What is claimed is:

1. A denoising apparatus comprising:
an image input unit configured to receive pixel data including color information of pixels included in a correction target image;
a denoising unit configured to denoise the pixel data by a weighted-averaging method, wherein a weight is set to a maximum value when a difference value between a correction target block and a comparison target block in the correction target image is zero, decreases linearly to zero as the difference value increases until it reaches a threshold value, and is set to zero when the difference value is equal to or greater than the threshold value; and
an image output unit configured to output denoised pixel data,
wherein the denoising unit is configured to assign a corrected weight value to at least a guaranteed number of comparison target blocks for an impulse block, and the impulse block is a correction target block for which the number of non-zero weight valued comparison target blocks is less than a predetermined guaranteed number.

2. The denoising apparatus of claim 1, wherein if there is another non-zero weight valued impulse block among the comparison target blocks, the denoising unit is configured to assign the corrected weight value to some zero-weight valued general blocks among the comparison target blocks, and average the impulse block and the general blocks.

3. The denoising apparatus of claim 1, wherein the denoising unit is configured to sort the comparison target blocks for the impulse block based on their difference values, select up to the guaranteed number of comparison target blocks from those having smaller difference values as weight correction target blocks, and assign corrected weight values to the weight correction target blocks.

4. The denoising apparatus of claim 1, wherein the denoising unit is configured to classify the comparison target blocks for the impulse block based on their difference values, select at least the guaranteed number of comparison target blocks from those having smaller difference values based on the classification results as weight correction target blocks, and assign the corrected weight values to the weight correction target blocks.

5. The denoising apparatus of claim 4, wherein the denoising unit does not sort the comparison target blocks for the impulse block.

6. The denoising apparatus of claim 4, wherein the denoising unit is configured to assign the corrected weight value to zero-weight valued comparison target blocks of the weight correction target blocks.

7. The denoising apparatus of claim 1, wherein the denoising unit is configured to put the comparison target blocks for the impulse block into a plurality of bins corresponding to their difference values, wherein each bin is associated with a different range of difference values, and add the bins into a weight correction target bin one by one in the order of increasing difference value range of each bin until the number of comparison target blocks included in the weight correction target bin is greater than or equal to the guaranteed number.

8. The denoising apparatus of claim 7, wherein the plurality of bins include an internal bin having a difference value range from zero to the threshold value, and one or more external bins whose difference value ranges comprise values greater than the threshold value.

9. The denoising apparatus of claim 1, wherein the denoising apparatus is configured as an image signal processor (ISP).

10. A denoising method comprising:
inputting pixel data of a correction target image into a denoising apparatus; and
using the denoising apparatus to perform a weighted-average denoising process on the pixel data,
wherein said weighted-average denoising comprises:
setting a weight to a maximum value when a difference value between a correction target block and a comparison target block is zero, setting the weight to decrease linearly to zero as the difference value increases until it reaches a threshold value, and setting the weight to zero when the difference value is equal to or greater than the threshold value;
assigning a corrected weight value to at least a guaranteed number of comparison target blocks whose difference value is greater than the threshold value; and
averaging the correction target block and the comparison target blocks to which the corrected weight value has been assigned to reduce noise in the correction target block pixel data,
wherein a correction target block for which the number of non-zero weight valued comparison target blocks is less than a predetermined guaranteed number is an impulse block.

11. The denoising method of claim 10, wherein said assigning comprises:
sorting the comparison target blocks for the impulse block based on the difference value;
selecting up to the guaranteed number of comparison target blocks having smaller difference values as weight correction target blocks using the sorting result; and
assigning the corrected weight value to the weight correction target blocks.

12. The denoising method of claim 10, wherein said assigning a corrected weight value comprises:
providing a plurality of bins having different ranges of the difference value;
putting each comparison target block for the impulse block into one of the plurality of bins corresponding to its difference value; and
adding the plurality of bins one by one in order of increasing a difference value range of each bin into a weight correction target bin until the number of comparison target blocks included in the weight correction target bin is greater than or equal to the guaranteed number.

13. A method for denoising pixels in a digital image, said method comprising the steps of:
receiving pixel data of a correction target image, wherein said correction target image includes a correction target block of pixels to be denoised, and one or more comparison target blocks of pixels;
setting a weight to a maximum value when a difference value between the correction target block and a comparison target block is zero;
setting the weight to decrease linearly to zero as the difference value increases until it reaches a threshold value;
setting the weight to zero when the difference value is equal to or greater than the threshold value;
assigning a corrected weight value to at least a guaranteed number of comparison target blocks whose difference value is greater than the threshold value; and
averaging the correction target block and the comparison target blocks to which the corrected weight value has been assigned to reduce noise in the correction target block pixel data,
wherein a correction target block for which the number of non-zero weight valued comparison target blocks is less than a predetermined guaranteed number is an impulse block.

14. The denoising method of claim 13, further comprising, if there is another non-zero weight valued impulse block among the comparison target blocks, assigning the corrected weight value to some zero-weight valued general blocks among the comparison target blocks, and averaging the impulse block and the general blocks.

15. The denoising method of claim 13, wherein assigning a corrected weight value comprises:
sorting the comparison target blocks for the impulse block based on the difference value;
selecting up to the guaranteed number of comparison target blocks having smaller difference values as weight correction target blocks using the sorting result; and
assigning the corrected weight value to the weight correction target blocks.

16. The denoising method of claim 13, wherein assigning a corrected weight value comprises:
providing a plurality of bins having different ranges of the difference value;
putting each comparison target block for the impulse block into one of the plurality of bins corresponding to its difference value; and
adding the plurality of bins one by one in order of increasing difference value range of each bin into a weight correction target bin until the number of comparison target blocks included in the weight correction target bin is greater than or equal to the guaranteed number.

17. The denoising method of claim 16, wherein the plurality of bins include an internal bin having a difference value range from zero to the threshold value, and one or more external bins whose difference value ranges comprise values greater than the threshold value.

18. The denoising method of claim 17, further comprising:
receiving the range size of the external bins and the number of external bins.

19. The denoising method of claim 13, further comprising:
receiving at least one of the threshold value, the guaranteed number, and the corrected weight value as an input.

20. The denoising method of claim 19, further comprising:
storing the at least one of the threshold value, the guaranteed number, and the corrected weight value.

* * * * *